United States Patent
Adhinarayanan et al.

(10) Patent No.: US 12,086,418 B1
(45) Date of Patent: Sep. 10, 2024

(54) MEMORY SPRINTING

(71) Applicant: Advanced Micro Devices, Inc., Santa Clara, CA (US)

(72) Inventors: Vignesh Adhinarayanan, Austin, TX (US); Michael Ignatowski, Austin, TX (US); Hyung-Dong Lee, Austin, TX (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 18/129,436

(22) Filed: Mar. 31, 2023

(51) Int. Cl.
*G06F 3/06* (2006.01)

(52) U.S. Cl.
CPC .......... *G06F 3/0613* (2013.01); *G06F 3/0634* (2013.01); *G06F 3/0673* (2013.01)

(58) Field of Classification Search
None
See application file for complete search history.

(56) References Cited

U.S. PATENT DOCUMENTS

2017/0329710 A1* 11/2017 Krause ................ G06F 13/1673

OTHER PUBLICATIONS

Charles, James, Preet Jassi, Narayan S. Ananth, Abbas Sadat, and Alexandra Fedorova; "Evaluation of the Intel® Core™ i7 Turbo Boost Feature"; 2009 IEEE International Symposium on Workload Characterization (IISWC); IEEE, 2009; 10 pages.

Raghavan, Arun, Yixin Luo, Anuj Chandawalla, Marios Papaefthymiou, Kevin P. Pipe, Thomas F. Wenisch, and Milo MK Martin; "Computational Sprinting"; IEEE international symposium on high-performance comp architecture; IEEE, 2012; 12 pages.

Huang, Ziqiang, JoséA. Joao, Alejandro Rico, Andrew D. Hilton, and Benjamin C. Lee; "Dynasprint: Microarchitectural Sprints With Dynamic Utility and Thermal Management"; In Proceedings of the 52nd Annual IEEE/ACM International Symposium on Microarchitecture; 2019.

"Turbo Core Technology"; author unknown, downloaded from URL https://www.amd.com/en/technologies/turbo-core on Mar. 30, 2023, © Advanced Micro Devices, Inc. 2023.

* cited by examiner

*Primary Examiner* — Charles J Choi
(74) *Attorney, Agent, or Firm* — Polansky & Associates, P.L.L.C.; Paul J. Polansky; Nathan H. Calvert

(57) ABSTRACT

A memory sprint controller, responsive to an indicator of an irregular memory access phase, causes a memory controller to enter a sprint mode in which it temporarily adjusts at least one timing parameter of a dynamic random access memory (DRAM) to reduce a time in which a designated number of activate (ACT) commands are allowed to be dispatched to the DRAM.

20 Claims, 6 Drawing Sheets

US 12,086,418 B1

MEMORY SPRINTING

CROSS REFERENCE TO RELATED, COPENDING APPLICATION

This application is related to U.S. patent application Ser. No. 18/129,390, filed Mar. 31, 2023, entitled "Memory Sprinting" invented by the inventors hereof and assigned to the assignee hereof.

BACKGROUND

Computer systems typically use inexpensive and high density dynamic random access memory (DRAM) chips for main memory. Most DRAM chips sold today are compatible with various double data rate (DDR) DRAM standards promulgated by the Joint Electron Devices Engineering Council (JEDEC). DDR DRAMs use conventional DRAM memory cell arrays with high-speed access circuits to achieve high transfer rates and to improve the utilization of the memory bus. Other memory technologies such as High Bandwidth Memory (HBM) modules also have increased transfer rates.

Figure 1:
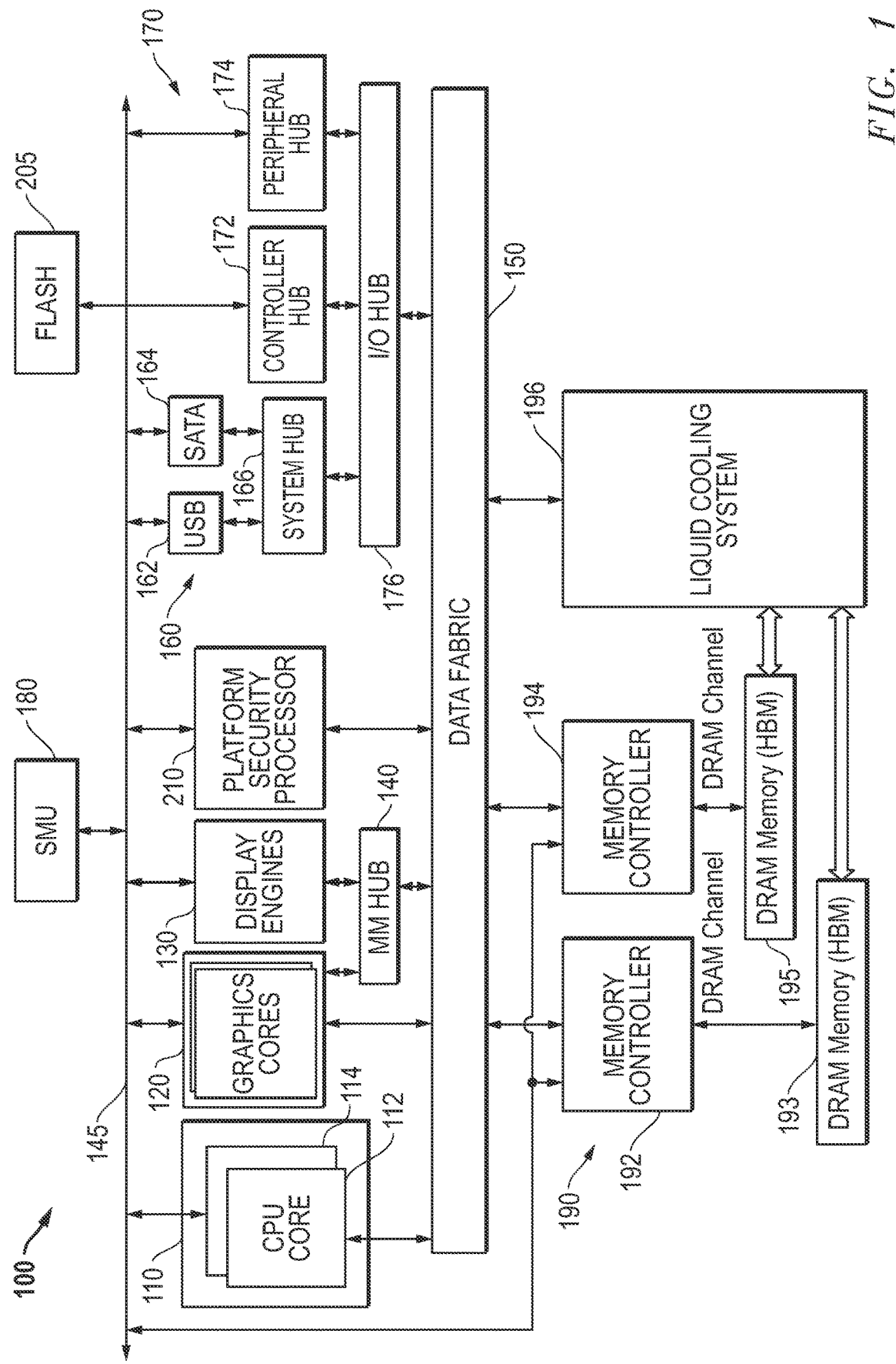
FIG. 1 illustrates in block diagram form an accelerated processing unit (APU) 100 with a connected DRAM memory according to some embodiments.

In the following description, the use of the same reference numerals in different drawings indicates similar or identical items. Unless otherwise noted, the word "coupled" and its associated verb forms include both direct connection and indirect electrical connection by means known in the art, and unless otherwise noted any description of direct connection implies alternate embodiments using suitable forms of indirect electrical connection as well.

DETAILED DESCRIPTION OF ILLUSTRATIVE EXAMPLES

A memory system includes a memory controller and a memory sprint controller. The memory controller is for selecting memory access commands for dispatch over a memory channel to a DRAM. The memory sprint controller is in communication with the memory controller and, responsive to an indicator of an irregular memory access phase, causes the memory controller to enter a sprint mode in which it temporarily adjusts at least one timing parameter of the DRAM to reduce a time in which a designated number of ACT commands are allowed to be dispatched to the DRAM.

A method includes, responsive to an indicator of an irregular memory access phase, causing a memory controller to enter a sprint mode by temporarily adjusting at least one timing parameter of a DRAM to reduce a time in which a designated number of ACT commands are allowed to be dispatched to the DRAM.

A data processing system, includes a central processing unit, a data fabric connected to the central processing unit, and a memory controller. The memory controller is connected to the data fabric for fulfilling memory access requests made through the data fabric. The memory controller includes a command queue, an arbiter circuit, and a memory sprint controller. The command queue includes a plurality of entries for holding memory access commands. The arbiter circuit is for selecting memory access commands from the command queue for dispatch over a memory channel to a DRAM. The memory sprint controller, responsive to an indicator of an irregular memory access phase, enters a sprint mode in which it temporarily adjusts at least one timing parameter for the DRAM to reduce a time in which a designated number of ACT commands are allowed to be dispatched to the DRAM by the memory controller.

The total transfer rates or throughput for a memory module is affected by whether the memory accesses frequently access memory rows that are already open (regular accesses) or access a higher variety of addresses in an irregular sequence (irregular accesses). Various applications such as hyperscalars, high-performance computing (HPC), advanced driver assistance systems (ADAS), and gaming and computer graphics frequently run irregular applications like graph analytics, unstructured grid simulations, and point-cloud data processing. Such applications frequently exhibit irregular memory access periods, which are time periods or phases in which accesses frequently involve activating a row in the DRAM memory. The appearance of irregular memory access periods tend to reduce the bandwidth efficiency and throughput of the DRAM channel as compared with the those of regular memory access periods, which include more frequent accesses to already activated rows. These efficiency issues are a result of timing associated with activating a new row, as compared with accessing an already open or activated row.

One existing solution to these efficiency issues is to adopt very small row sizes in the DRAM memory. Another solution is to increase the number of voltage pumps and power delivery networks for the networks for the wordline voltage (VPP) inside the DRAM device to mitigate the power burden of activating a row. However, while these approaches may be useful for specific applications, they are not favored for mainstream memory designs because of the increased costs of including such features and the timeline necessary for adoption.

FIG. 1 illustrates in block diagram form an accelerated processing unit (APU) 100 with a connected DRAM memory according to some embodiments. APU 100 is implemented as a System-on-Chip (SoC) which may be part of a variety of host data processing platforms. While an APU is shown in this embodiment, other data processing platforms such as a central processing unit (CPU) or a graphics processing unit (GPU) may be used. APU 100 includes generally a CPU core complex 110, a graphics core 120, a set of display engines 130, a memory management hub 140, a data fabric 150, a set of peripheral controllers 160, a set of peripheral bus controllers 170, a system management unit (SMU) 180, a platform security processor (PSP) 210, a flash memory 205, a set of memory controllers 190. Also shown connected to APU 100 are two DRAM memories 193 and 195, and a liquid cooling system 196, which together form a data processing system.

CPU core complex 110 includes a CPU core 112 and a CPU core 114. In this example, CPU core complex 110 includes two CPU cores, but in other embodiments CPU core complex 110 can include an arbitrary number of CPU cores. Each of CPU cores 112 and 114 is bidirectionally connected to a system management network (SMN) 145, which forms a control fabric, and to data fabric 150, and is capable of providing memory access requests to data fabric 150. Each of CPU cores 112 and 114 may be unitary cores, or may further be a core complex with two or more unitary cores sharing certain resources such as caches.

Graphics core 120 is a high performance graphics processing unit (GPU) capable of performing graphics operations such as vertex processing, fragment processing, shading, texture blending, and the like in a highly integrated and parallel fashion. Graphics core 120 is bidirectionally connected to the SMN 145 and to data fabric 150, and is capable of providing memory access requests to data fabric 150. In this regard, APU 100 may either support a unified memory architecture in which CPU core complex 110 and graphics core 120 share the same memory space, or a memory architecture in which CPU core complex 110 and graphics core 120 share a portion of the memory space, while graphics core 120 also uses a private graphics memory not accessible by CPU core complex 110.

Display engines 130 render and rasterize objects generated by graphics core 120 for display on a monitor. Graphics core 120 and display engines 130 are bidirectionally connected to a common memory management hub 140 for uniform translation into appropriate addresses in memory, and memory management hub 140 is bidirectionally connected to data fabric 150 for generating such memory accesses and receiving read data returned from the memory system.

Data fabric 150 includes a crossbar switch for routing memory access requests and memory responses between any memory accessing agent and memory controllers 190. It also includes a system memory map, defined by basic input/output system (BIOS), for determining destinations of memory accesses based on the system configuration, as well as buffers for each virtual connection.

Peripheral controllers 160 include a USB controller 162 and a serial advanced technology attachment (SATA) interface controller 164, each of which is bidirectionally connected to a system hub 166 and to SMN 145. These two controllers are merely exemplary of peripheral controllers that may be used in APU 100.

Peripheral bus controllers 170 include a system controller hub 172 and a peripheral controller hub 174, each of which is bidirectionally connected to an input/output (I/O) hub 176 and to SMN 145. System controller hub 172 connects to Flash memory 205 over a suitable communications link. I/O hub 176 is also bidirectionally connected to system hub 166 and to data fabric 150. Thus, for example, a CPU core can program registers in USB controller 162, SATA interface controller 164, system controller hub 172, or peripheral controller hub 174 through accesses that data fabric 150 routes through I/O hub 176.

SMU 180 is a local controller that controls the operation of the resources on APU 100 and synchronizes communication among them. SMU 180 manages power-up sequencing of the various processors on APU 100 and controls multiple off-chip devices via reset, enable and other signals. SMU 180 also manages power for the various processors and other functional blocks.

Set of memory controllers 190 includes a first memory controller 192 coupled to a DRAM memory 193, and a second memory controller 194 coupled to a DRAM memory 195. Each of memory controller 193 and 195 includes a bidirectional connection to data fabric 150, a bidirectional connection to SMN 145, and a bidirectional connection to a respective DRAM memory over a DRAM channel. In this embodiment, DRAM memories 193 and 195 are HBM memory modules, but in other embodiments may be other types of memory modules such as DDRx DIMMs.

Liquid cooling system 196 has a bidirectional connection to data fabric 150, but may instead be connected to SMN145. Liquid cooling system 196 is thermally coupled to each of DRAM memories 193 and 195 through a liquid coolant flow system, and generally includes electronics for controlling the flow of liquid coolant to provide additional cooling to DRAM memories 193 and 195.

Platform security processor (PSP) 210 is a local security controller that controls the firmware booting process aboard APU 100. PSP 210 also performs certain software validation and Firmware Anti-Rollback (FAR) features, as will be further described below.

In operation, CPU cores 112 and 114, and graphics cores 120, may execute tasks that generate memory accesses to memory controllers 192 and 194 with irregular access phases in which a new memory row is activated more frequently than during regular or typical memory operation. To handle such phases with more efficient use of the DRAM channels, memory controllers 192 and 194 are able to enter a sprint mode in which memory timing parameters are adjusted, as further discussed below. During a sprint mode, liquid cooling system 196 may also be used to increase coolant flow to one or both of DRAM memories 193 and 195.

While a SoC implementation is shown, this is not limiting, and other computing platforms may also benefit from memory sprint techniques set forth herein.

Figure 2:
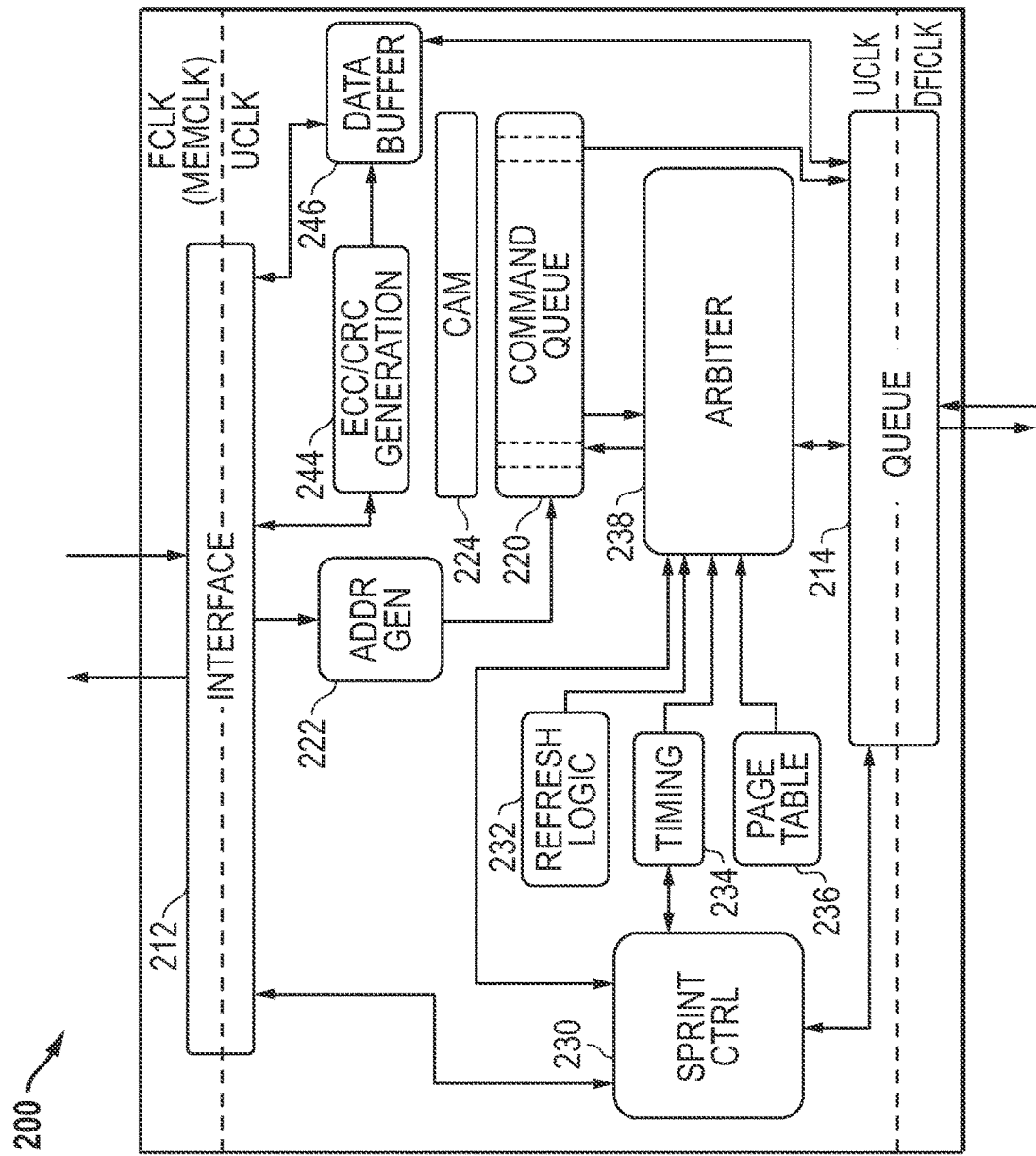
FIG. 2 illustrates in block diagram form a memory controller suitable for use in an APU like that of FIG. 1 according to some embodiments.

FIG. 2 illustrates in block diagram form a memory controller 200 that is suitable for use in an APU like that of FIG. 1. Memory controller 200 includes generally an interface 212, a memory interface queue 214, a command queue 220, an address generator 222, a content addressable memory (CAM) 224, a memory sprint controller 230, a refresh control logic block 232, refresh control logic 232, a timing block 234, a page table 236, an arbiter 238, an ECC generation block 244, a data buffer 246.

Interface 212 has a first bidirectional connection to data fabric over an external bus, and has an output. In memory controller 200, this external bus is compatible with the advanced extensible interface version four specified by ARM Holdings, PLC of Cambridge, England, known as "AXI4", but can be other types of interfaces in other embodiments. Interface 212 translates memory access requests from a first clock domain known as the FCLK (or MEMCLK) domain to a second clock domain internal to memory controller 200 known as the UCLK domain. Similarly, memory interface queue 214 provides memory accesses from the UCLK domain to a DFICLK domain associated with the DFI interface.

Address generator 222 decodes addresses of memory access requests received from the data fabric over the AXI4 bus. The memory access requests include access addresses in the physical address space represented in a normalized format. Address generator 222 converts the normalized addresses into a format that can be used to address the actual memory devices in memory system, as well as to efficiently schedule related accesses. This format includes a region identifier that associates the memory access request with a particular rank, a row address, a column address, a bank address, and a bank group. On startup, the system BIOS queries the memory devices in memory system to determine their size and configuration, and programs a set of configuration registers associated with address generator 222. Address generator 222 uses the configuration stored in the configuration registers to translate the normalized addresses into the appropriate format. Command queue 220 is a queue of memory access requests received from the memory accessing agents in APU 100, such as CPU cores 112 and 114 and graphics core 120. Command queue 220 stores the address fields decoded by address generator 222 as well other address information that allows arbiter 238 to select memory accesses efficiently, including access type and quality of service (QOS) identifiers. CAM 224 includes information to enforce ordering rules, such as write after write (WAW) and read after write (RAW) ordering rules. Command queue 220 is a stacked command queue including multiple entry stacks each containing multiple command entries, in this embodiment 32 entry stacks of four entries each, as further described below.

Error correction code (ECC) generation block 244 determines the ECC of write data to be sent to the memory. This ECC data is then added to the write data in data buffer 246. An ECC check circuit (not shown separately) checks the received ECC against the incoming ECC.

In this embodiment, memory sprint controller 230 is a digital circuit including a bidirectional connection to interface 212, a bidirectional connection to arbiter 238, a bidirectional connection to memory interface queue 214, and a bidirectional connection to timing block 234. Generally, memory sprint controller 230 is operable to, responsive to an indicator of an irregular memory access phase, enter a sprint mode in which it temporarily adjusts at least one timing parameter of the DRAM to reduce a time in which a designated number of activate (ACT) commands are allowed to be dispatched to the RAM. The functionality of memory sprint controller 230 is further described below with respect to FIG. 5-FIG. 7. Memory sprint controller 230 may also include circuitry for calculating a ratio of column-address strobe (CAS) commands to ACT commands, on which the indicator of an irregular memory access phase is based in some embodiments. Such a ratio may be forward looking, that is, calculated based on memory access commands currently in the command queue. Or, such a ratio may be calculated based on a rolling window of memory access commands dispatched to the DRAM.

Refresh control logic 232 includes state machines for various powerdown, refresh, and termination resistance (ZQ) calibration cycles that are generated separately from normal read and write memory access requests received from memory accessing agents. For example, if a memory rank is in precharge powerdown, it must be periodically awakened to run refresh cycles. Refresh control logic 232 generates refresh commands periodically and in response to designated conditions to prevent data errors caused by leaking of charge off storage capacitors of memory cells in DRAM chips. In addition, refresh control logic 232 periodically calibrates ZQ to prevent mismatch in on-die termination resistance due to thermal changes in the system.

Arbiter 238 is bidirectionally connected to command queue 220 and is the heart of memory controller 200, performing intelligent scheduling of accesses to improve the usage of the memory bus. Arbiter 238 uses timing block 234 to enforce proper timing relationships by determining whether certain accesses in command queue 220 are eligible for issuance based on DRAM timing parameters. For example, each DRAM has a minimum specified time between activate commands to the same bank, known as "tRC", a time four activate window known as "tFAW" which provides a time in which a designated number of activate (ACT) commands are allowed to be dispatched to the RAM, and a minimum specified time required between any two refresh per-bank (REFpb) or refresh per two banks (REFp2b) commands, known as "tRREFD". Timing block 234 maintains a set of counters that determine eligibility based on this and other timing parameters specified in the JEDEC specification, based on a set of DRAM timing parameters stored locally in a timing parameter table or other suitable data structure. Page table 236 maintains state information about active pages in each bank and rank of the memory channel for arbiter 238. Arbiter 238 includes a single command input for each entry stack of command queue 220, and selects commands therefrom to schedule for dispatch through memory interface queue 214 to the DRAM channel.

In response to write memory access requests received from interface 212, ECC generation block 244 computes an ECC according to the write data. Data buffer 246 stores the write data and ECC for received memory access requests. It outputs the combined write data/ECC to memory interface queue 214 when arbiter 238 picks the corresponding write access for dispatch to the memory channel.

Memory controller 200 includes circuitry that allows it to pick memory accesses for dispatch to the associated memory channel. In order to make the desired arbitration decisions, address generator 222 decodes the address information into predecoded information including rank, row address, column address, bank address, and bank group in the memory system, and command queue 220 stores the predecoded information. Configuration registers (not shown) store configuration information to determine how address generator 222 decodes the received address information. Arbiter 238 uses the decoded address information, timing eligibility information indicated by timing block 234, and active page information indicated by page table 236 to efficiently schedule memory accesses while observing other criteria such as quality of service (QOS) requirements.

Figure 3:
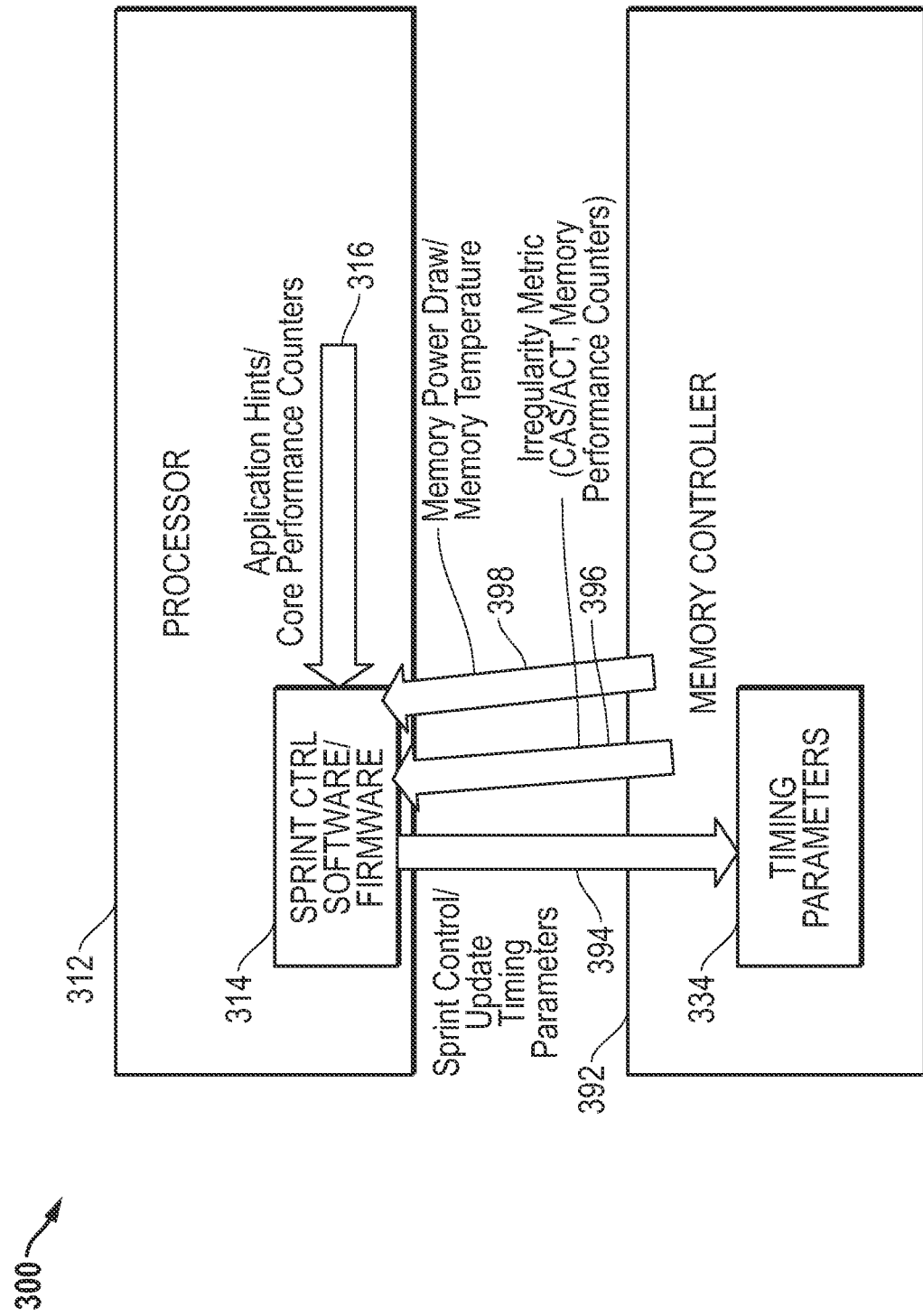
FIG. 3 illustrates in block diagram form a portion of a memory system 300 according to some alternative embodiments.

FIG. 3 illustrates in block diagram form a portion of a memory system 300 according to some alternative embodiments. The depicted portion of memory system 300 implements a memory sprint controller as software or firmware, as opposed to the hardware implementation shown in FIG. 2, and is suitable for use with a memory controller constructed as described above with respect to FIG. 2, only without memory sprint controller 230 implemented in the memory controller. The depicted portion of a memory system 300 includes a processor 312 executing a memory sprint controller software or firmware module 314 in communication with a memory controller 392 including timing parameters 334, which as discussed above control a timing block of the memory controller.

Processor 312 may be any type of processor that generates memory accesses to a memory controller and has need of improving DRAM channel efficiency during irregular memory access periods. For example, some or all of CPU cores 112 and 114 and graphics cores 120 (FIG. 1) may employ memory sprint controller software or firmware modules 314. In some embodiments, another dedicated processor core in the host SoC may execute one or more memory sprint controller software or firmware modules 314. For example, such a processor core may be attached to data fabric 150 and be in communication with multiple CPU or GPU cores for implementing a memory sprint controller.

As shown in FIG. 3, in this embodiment memory sprint controller software or firmware module 314 receives application hints or outputs of core performance counters 316 from various applications or processor core firmware to characterize the memory accesses for a DRAM accessed through memory controller 392. An application hint is a message from an application, such as an inter-thread message or other suitable message format, that communicates that the application is starting or ending a series of irregular memory accesses. Such hints may be provided by application developers through an application protocol interface (API), for example. Core performance counters such as translation lookaside buffer (TLB) misses may be passed to memory sprint controller software or firmware module 314. Based on such core performance counters, memory sprint controller software or firmware module 314 may identify when an irregular memory access phase has started or will start, and has ended or will end.

Memory sprint controller software or firmware module 314 also receives various data from memory controller 392, passed through interface 212 for example, and used for determining when to enter and leave memory sprint modes. An irregularity metric may be communicated, as shown by arrow 396. Such an irregularity metric may be a CAS/ACT ratio, as further discussed below, or other metrics or performance counter data tracked by memory performance counters in memory controller 392, based upon which an irregular memory access phase may be identified. For example, performance counter data such as CAS commands issued, ACT commands issued may be passed from memory controller 392 to memory sprint controller software or firmware module 314. Memory power draw and memory temperature data 398 are communicated from memory controller 392 to memory sprint controller software or firmware module 314. These data elements provide current temperature and power draw readings from the DRAM for determining whether a memory sprint may be safely entered or continued.

In order to control the memory sprint phase, memory sprint controller software or firmware module 314 causes memory sprint control signals 394 to be transmitted to memory controller 392. In this embodiment, the memory sprint control signals are implemented by writing new values to selected timing parameters in timing parameters 334. In other embodiments, other suitable signals commanding memory controller 392 to start and stop a memory sprint mode may be used. For example, two or more sets of timing parameters may be held at memory controller 392, which may be instructed to change operation to use a different set of timing parameters.

In operation, memory sprint controller software or firmware module 314, responsive to an indicator of an irregular memory access phase, causes the memory controller to enter a sprint mode in which it temporarily adjusts at least one timing parameter of the DRAM to reduce a time in which a designated number of activate (ACT) commands are allowed to be dispatched to the DRAM. As further described below, memory sprint controller software or firmware module 314 may also adjust other timing parameters. Memory sprint controller software or firmware module 314 may also control a liquid cooling system to increase coolant flow to the DRAM.

As can be understood, while a hardware implementation and a software/firmware implementation have been shown, in other embodiments the functionality of a memory sprint controller may be implemented by a mixture of memory controller hardware and system software/firmware in cooperation.

Figure 4:
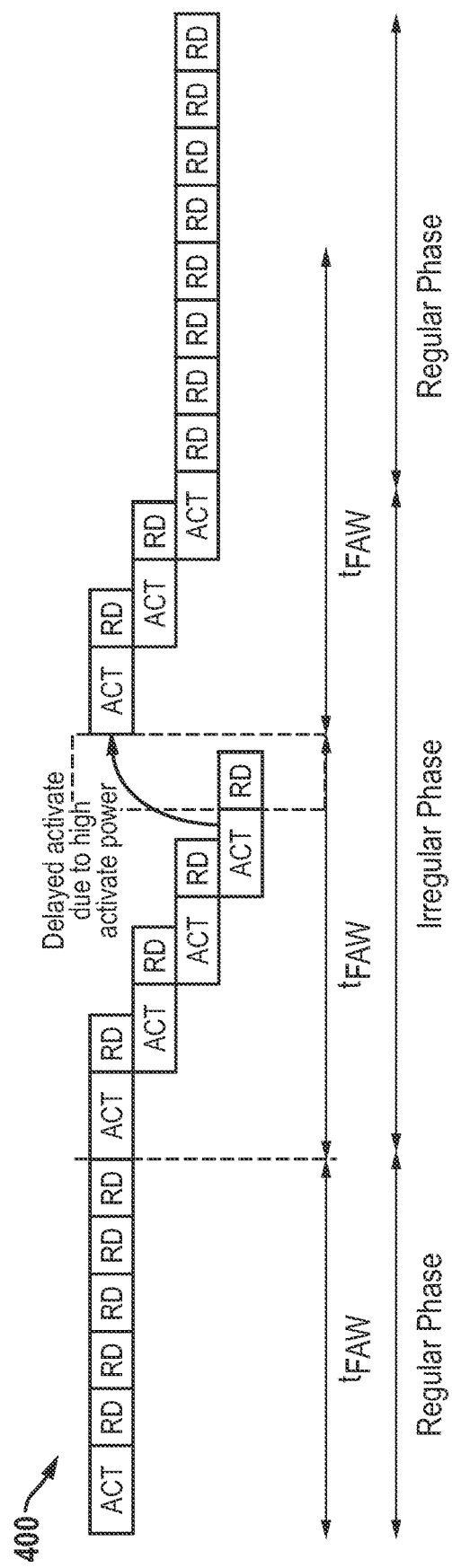
FIG. 4 shows a timing diagram illustrating an example scenario including irregular memory access phase without a memory sprint mode.

FIG. 4 shows a timing diagram 400 illustrating an example scenario including irregular memory access phase without a memory sprint mode. Timing diagram 400 shows a series of memory access commands dispatched to a DRAM over time. The depicted scenario includes two regular memory access phases, labelled "Regular Phase", and an irregular memory access phase labelled "Irregular Phase". In the first Regular Phase, an ACT command is followed by five read commands ("RD") to the activated row, with a tFAW timing interval labelled "$t_{FAW}$" shown relative to the commands. In the Irregular Phase, only one read is performed to each activated row for seven consecutive ACT commands. During a tFAW interval only a designated number (four) activated commands are allowed to be dispatched, and so the fifth ACT in the Irregular phase is delayed. As discussed above, the length of tFAW is typically set to limit high row activation power, and so the highlighted delay before the fifth ACT allows time for the memory PDN to recover from the first four ACT commands. A new tFAW interval begins and the fifth ACT command is allowed to be dispatched. As can be understood, the longer the setting for tFAW, the more inefficiency may result during an irregular memory access phase because a longer delay results at the location of the depicted delay. The depicted scenario is one in which no memory sprint is employed, and tFAW is constant across the Regular Phases and the Irregular Phase.

Figure 5:
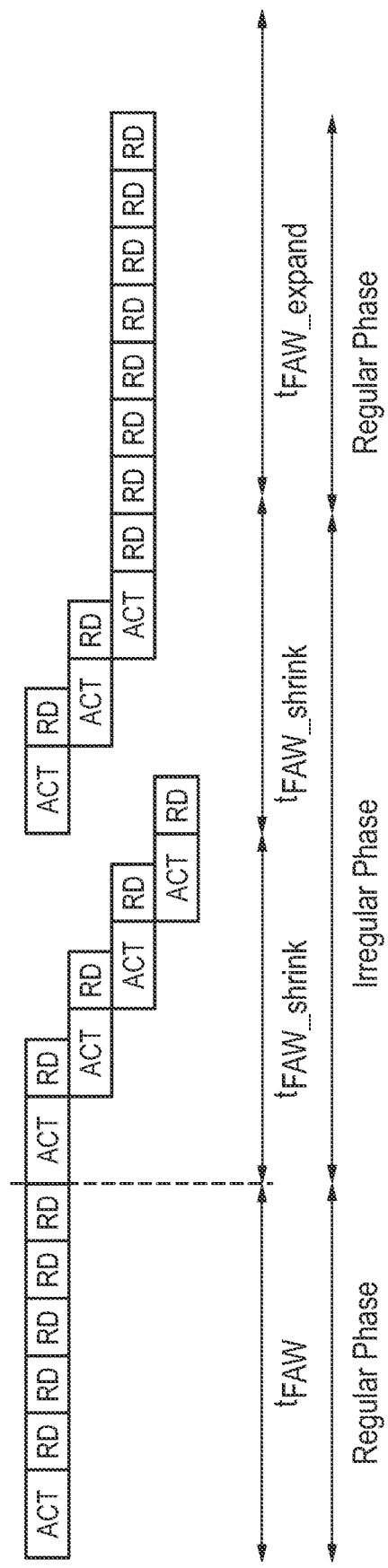
FIG. 5 shows a timing diagram illustrating an example scenario including an irregular memory access phase during a memory sprint mode.

FIG. 5 shows a timing diagram 500 illustrating an example scenario including an irregular memory access phase during a memory sprint mode. As shown, the tFAW timing interval is shrunk at the start of an Irregular Phase, as indicated by the shorter tFAW interval labelled "$t_{FAW\_shrink}$". This allows the fifth ACT command in the Irregular Phase to immediately follow the fourth ACT command, increasing the bandwidth efficiency during the Irregular Phase. The timing window is expanded again to end the memory sprint mode after two of the $t_{FAW\_shrink}$ periods. As discussed further below, ending the memory sprint mode may be based on the irregular access phase ending, or based on the memory temperature exceeding a designated temperature, such as the thermal design point, or the memory power draw exceeding a predetermined threshold.

Figure 6:
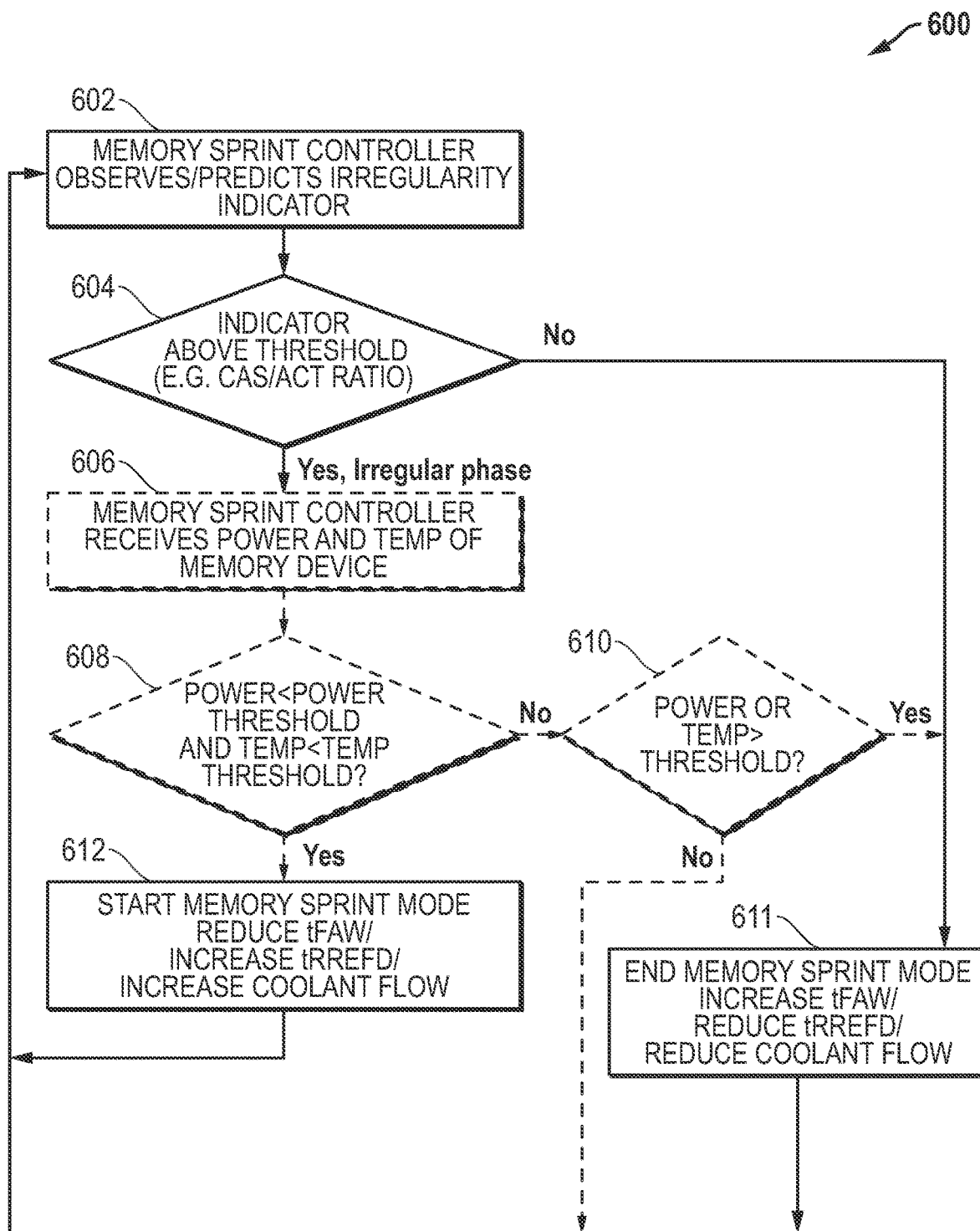
FIG. 6 shows a flowchart of a process for controlling a memory sprint mode according to some embodiments.

FIG. 6 shows a flowchart 600 of a process for controlling a memory sprint mode according to some embodiments. The depicted process is suitable for use with a variety of SoCs such as APU 100 (FIG. 1) or other processing SoCs which may use a variety of processor types. The process is suitable for use with a memory controller including a memory sprint controller 320 (FIG. 2), or a system with a software or firmware based memory sprint controller such as a that of FIG. 3, or a mixed implementation in which some of the process is performed in the memory controller and some in one or more processors. While flowchart 600 shows a linear process flow, it is understood that actions may occur in a different order using a different logical flow such as an event-driven process in which changes in inputs cause the memory sprint controller to perform actions in response.

At block 602, the process includes a memory sprint controller observing or predicting an indicator of an irregular memory access phase. Block 602 may include calculating the indicator of an irregular memory access phase, or the indicator may be observed directly from data provided to the memory sprint controller. For example, the indicator of the irregular memory access phase may be based on a ratio of column-address strobe (CAS) commands to ACT commands. Such a ratio may be forward looking, that is, calculated based on memory access commands currently in the command queue of the memory controller. Or, such a ratio may be calculated based on a rolling window of memory access commands dispatched to the DRAM. As another example, the indicator of an irregular memory access phase may be a hint from a processor coupled to the memory controller communicating that a period with frequent irregular memory accesses will occur. As yet another example, the indicator of an irregular memory access phase may include a communication from an application running on a host processor indicating that a period with frequent irregular memory accesses will occur. Other performance metrics from the memory controller or the host processor may also be used in calculating or producing the indicator of an irregular memory access phase.

At block 604, the process determines whether an indicator is above or below a threshold. If so, flow goes directly or indirectly to a block 612, in which the process causes the memory controller to enter a sprint mode by temporarily adjusting at least one timing parameter of a random access memory (RAM) to reduce a time in which a designated number of activate (ACT) commands are allowed to be dispatched to the RAM. As shown at block 604, in this embodiment, the indicator is determined to be above a designated threshold. In other embodiments, a Yes/No indicator may be used, or a number of data points may be used together to make the decision at block 604 that an irregular memory access phase will start or has started.

In some embodiments, as indicated by the dotted boxes on flowchart 600, additional data is checked before starting a memory sprint phase. At block 604, the memory sprint controller receives data about the current power usage and current temperature of the DRAM memory device or module for which a memory sprint may be activated. At block 608, this data is checked to determine if the power usage is below a designated threshold and the temperature is below a designated threshold. If so, the process continues to block 612 where it starts the memory sprint mode.

At block 612, the process starts memory sprint mode by temporarily adjusting at least one timing parameter of the DRAM to reduce a time in which a designated number of ACT commands are allowed to be dispatched to the DRAM. In one example, the tFAW is reduced at this point to shorten the time window limiting ACT commands sent to the DRAM. In some embodiments, other timing parameters may be changed. For example, a refresh interval may be increased to compensate for greater local power draws in the DRAM PDN due to the sprint mode. As shown, in this embodiment, the tRREFD interval is increased. In some embodiments, temporarily adjusting the at least one timing parameter of the DRAM includes causing a new value to be written to a timing parameter table of the memory controller. For memory systems that include a liquid cooling system, such as liquid cooling system 196 of FIG. 1, the memory sprint mode may also include commanding the liquid cooling system to increase the flow of coolant to the DRAM.

From block 612, the process returns to block 602 where it continues to observe or predict the irregularity indicator. During the memory sprint mode, if the indicator of an irregular memory access phase drops below the threshold at block 604, the process goes to block 611 where it ends the memory sprint mode. As shown, ending the memory sprint mode in this embodiment includes increasing the time in which a designated number of ACT commands are allowed to be dispatched to the DRAM, in this embodiment the tFAW parameter. This parameter is set back to its normal value. If a refresh interval has been increased during the memory sprint mode, it is also decreased at block 611. If a memory coolant flow was increased during the memory sprint mode, it is also decreased at block 611. Decreasing coolant flow may be performed with delay in order to remove additional heat generated during the memory sprint mode.

During the memory sprint mode, if the indicator of an irregular memory access phase is still above the threshold at block 604, the process may also decide to end the memory sprint mode based on the temperature or power consumption of the memory device. As shown at blocks 604 and 606, the DRAM temperature and DRAM power consumption are also monitored during the memory sprint mode. If either one exceeds their designated threshold, the process at block 610 goes to block 611 where it ends the memory sprint mode as described above. If neither threshold is exceeded at block 610, the process continues the memory sprint mode.

Thus a process has been described suitable for use with a hardware based memory sprint controller, or a software or firmware based memory sprint controller. While this particular process may be used for a memory sprint controller, other suitable processes may also be used with hardware or software/firmware based memory sprint controllers. For example, the process of FIG. 6 implements the memory sprint by temporarily adjusting one or more timing parameters for the DRAM without concern for the memory clock speed or voltage. In other embodiments, a change in the memory clock speed and data rate may be used instead of or in addition to adjusting one or more timing parameters of the DRAM, assuming that the DRAM and DRAM channel support a ramp time fast enough to benefit from such a memory sprint mode.

Generally, a memory sprint mode as described herein includes a temporary adjustment that ends, as described, when the irregular memory access phase is completed or when thermal or power conditions at the memory no longer allow the increased rate of ACT commands. In some memory systems, or in some conditions, the memory sprint mode may be as short as one or two periods of the tFAW timing parameter, while in other memory systems a sprint mode may be allowed to be active for a longer time. For example, some systems may provide for memory sprint modes that last many iterations of the tFAW period, such a 4, 8, 16, 32 or some other power-of-two multiple tFAW periods before thermal and power conditions at the memory trigger an exit from the memory sprint mode. While the process of selecting the length of the reduced tFAW period depends on the capabilities of the particular DRAM memory in use in the system, ideally it should be selected to allow release of ACT commands as soon as they are available, as depicted in FIG. 5. The speed of reporting temperature and power data from the DRAM for use in the memory sprint control process should also be considered, and would generally be set as fast as allowable for a particular DRAM memory in order to best control a memory sprint mode.

Figure 7:
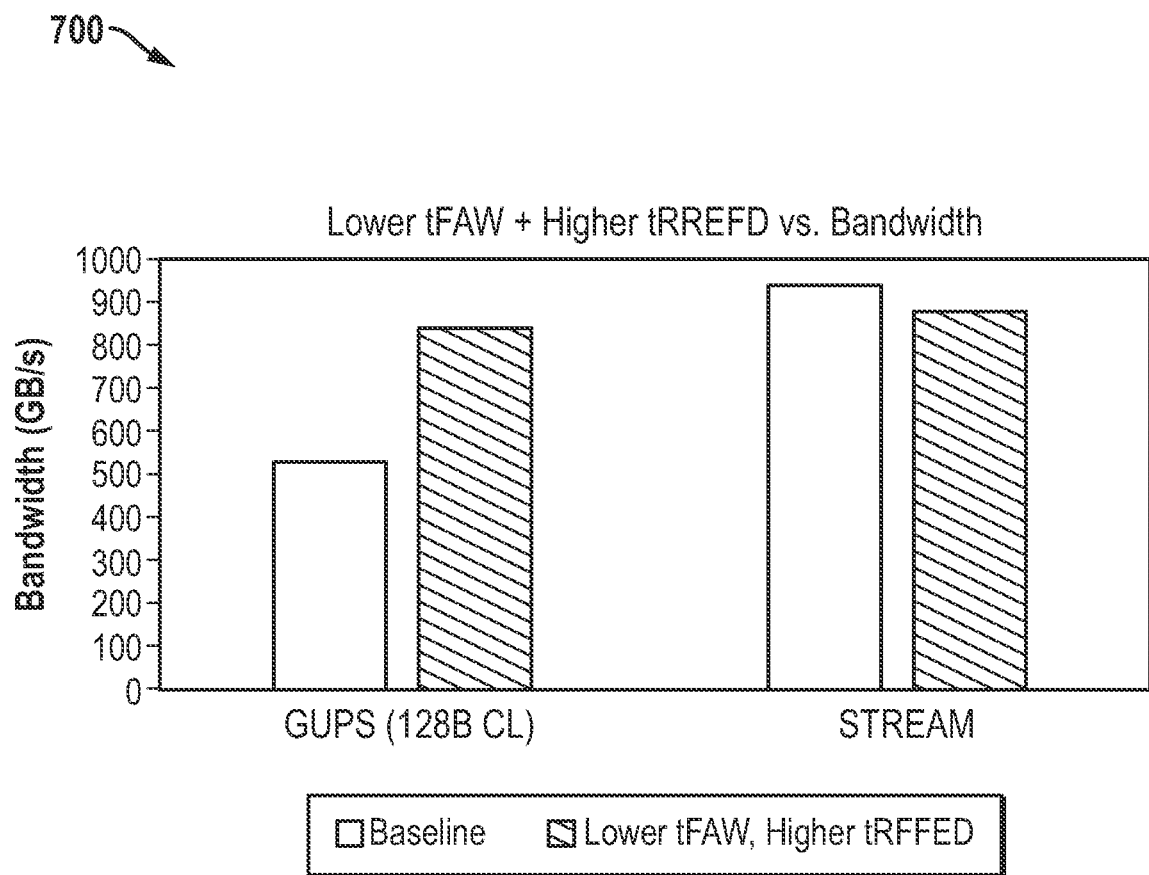
FIG. 7 shows a chart 700 comparing the throughput bandwidth for a DRAM channel in a normal operating mode and in a memory sprint mode.

FIG. 7 shows a chart comparing the throughput bandwidth for a DRAM channel for a baseline system without memory a memory sprint mode and a system using a memory sprint mode. The vertical axis shows the shows throughput bandwidth. On the left is shown throughput for an irregular access period for which a benchmark application for giga-updates per second (GUPS) is used. On the right is shown throughput for a regular access period for which a benchmark streaming application is used. Results are shown for normal timing parameter values, labelled "Baseline", and for memory sprint mode timing values (labelled "lower tFAW, higher tRREFD"). In the tests, tRREFD is increased from 8 nanoseconds (ns) (baseline) to 30 ns, a nominal value selected to compensate for tFAW=4× tRRD in a reference 1 TB/s HBM3 device.

Using the sprint mode, throughput is greatly increased for the GUPS benchmark application, while throughput is slightly reduced for the streaming benchmark application. The techniques herein to improve irregular access bandwidth by lowering tFAW in conjunction with increasing tRREFD affects regular bandwidth adversely. Increasing tRREFD from 8 ns to 30 ns to compensate for an optimal tFAW=4*tRRDS degrades regular bandwidth by 7.25% in this test. While a lower tFAW may be compensated for by increasing the refresh period to obtain better irregular bandwidth, this technique affects regular streaming application performance by increasing the time period when a bank remains inaccessible.

The circuits of FIG. 1, FIG. 2, and FIG. 3, or any portions thereof, such as arbiter 238 and memory sprint controller 230 may be described or represented by a computer accessible data structure in the form of a database or other data structure which can be read by a program and used, directly or indirectly, to fabricate integrated circuits. For example, this data structure may be a behavioral-level description or register-transfer level (RTL) description of the hardware functionality in a high level design language (HDL) such as Verilog or VHDL. The description may be read by a synthesis tool which may synthesize the description to produce a netlist including a list of gates from a synthesis library. The netlist includes a set of gates that also represent the functionality of the hardware including integrated circuits. The netlist may then be placed and routed to produce a data set describing geometric shapes to be applied to masks. The masks may then be used in various semiconductor fabrication steps to produce the integrated circuits. Alternatively, the database on the computer accessible storage medium may be the netlist (with or without the synthesis library) or the data set, as desired, or Graphic Data System (GDS) II data.

While particular embodiments have been described, various modifications to these embodiments will be apparent to those skilled in the art. For example, the internal architecture of memory controller 200 may vary in different embodiments. Memory controller 200 may interface to other types of memory besides DDRx, such as high bandwidth memory (HBM), RAMbus DRAM (RDRAM), and the like. While the illustrated embodiment showed each rank of memory corresponding to separate DIMMs or SIMMs, in other embodiments each module can support multiple ranks. Still other embodiments may include other types of DRAM modules or DRAMs not contained in a particular module, such as DRAMs mounted to the host motherboard. Accordingly, it is intended by the appended claims to cover all modifications of the disclosed embodiments that fall within the scope of the disclosed embodiments.

What is claimed is:

1. A memory system, comprising:
a memory controller for selecting memory access commands for dispatch over a memory channel to a dynamic random access memory (DRAM); and
a memory sprint controller in communication with the memory controller that, responsive to an indicator of an irregular memory access phase, causes the memory controller to enter a sprint mode in which it temporarily adjusts at least one timing parameter of the DRAM to reduce a time in which a designated number of activate (ACT) commands are allowed to be dispatched to the DRAM.

2. The memory system of claim 1, wherein:
the memory sprint controller comprises one of: a firmware module running on a host processor for which the memory controller provides memory access, and a software module running on the host processor.

3. The memory system of claim 2, wherein:
the memory sprint controller temporarily adjusts the at least one timing parameter of the DRAM by writing a new value to a timing parameter table of the memory controller.

4. The memory system of claim 2, wherein:
the indicator of an irregular memory access phase comprises a communication from an application running on the processor indicating that a period with frequent irregular memory accesses will occur.

5. The memory system of claim 1, wherein:
the indicator of the irregular memory access phase is based on a ratio of column-address strobe (CAS) commands to ACT commands.

6. The memory system of claim 1, wherein:
the memory sprint controller temporarily adjusts a refresh interval timing parameter for the DRAM to increase a refresh interval during the sprint mode.

7. The memory system of claim 1, wherein:
the at least one timing parameter is a time four activate window (tFAW) parameter.

8. The memory system of claim 1, wherein:
the memory sprint controller determines when to end the sprint mode based on either of: the indicator of an irregular memory access phase indicating that the irregular memory access phase is over, or an indicator of current power consumption at the DRAM and an indicator of current temperature at the DRAM.

9. A method, comprising:
responsive to an indicator of an irregular memory access phase, causing a memory controller to enter a sprint mode by temporarily adjusting at least one timing parameter of a dynamic random access memory (DRAM) to reduce a time in which a designated number of activate (ACT) commands are allowed to be dispatched to the DRAM.

10. The method of claim 9, further comprising:
at a processor coupled to the memory controller, executing one of: a firmware module which determines to enter the sprint mode, and a software module which determines when to enter the sprint mode.

11. The method of claim 10, wherein:
temporarily adjusting the at least one timing parameter of the DRAM includes causing a new value to be written to a timing parameter table of the memory controller.

12. The method of claim 9, wherein:
the indicator of an irregular memory access phase comprises a communication from an application running on a host processor indicating that a period with frequent irregular memory accesses will occur.

13. The method of claim 9, further comprising:
determining whether to enter the sprint mode further based on an indicator of current power consumption at the DRAM and an indicator of current temperature at the DRAM.

14. The method of claim 9, wherein:
the indicator of an irregular memory access phase comprises a signal from a processor communicating that a period with frequent irregular memory accesses will occur.

15. The method of claim 9, further comprising:
determining when to end the sprint mode based on an indicator of current power consumption at the DRAM and an indicator of current temperature at the DRAM.

16. The method of claim 9, further comprising:
during the sprint mode, increasing flow of a coolant to a cooling system for the DRAM.

17. A data processing system, comprising:
a central processing unit;
a data fabric coupled to the central processing unit;
a memory controller coupled to the data fabric for fulfilling memory access requests made through the data fabric, the memory controller comprising:
   a command queue including a plurality of entries for holding memory access commands; and
   an arbiter circuit for selecting memory access commands from the command queue for dispatch over a memory channel to a dynamic random access memory (DRAM); and
   a memory sprint controller that, responsive to an indicator of an irregular memory access phase, enters a sprint mode in which it temporarily adjusts at least one timing parameter for the DRAM to reduce a time in which a designated number of activate (ACT) commands are allowed to be dispatched to the DRAM by the memory controller.

18. The data processing system of claim 17, wherein:
the memory sprint controller temporarily adjusts a refresh interval timing parameter for the DRAM to increase a refresh interval during the sprint mode.

19. The data processing system of claim 17, wherein:
the memory sprint controller further determines whether to enter the sprint mode based on an indicator of current power consumption at the DRAM and an indicator of current temperature at the DRAM.

20. The data processing system of claim 17, further comprising:
a cooling system thermally coupled to the DRAM, wherein the memory sprint controller is further operable for, during the sprint mode, causing a flow of coolant to the cooling system to be increased.

\* \* \* \* \*